United States Patent [19]

Bruno

[11] Patent Number: 4,514,963
[45] Date of Patent: May 7, 1985

[54] SYSTEM FOR REGULATING THE FEED OF ARTICLES TO A WRAPPING MACHINE

[75] Inventor: Carlo L. Bruno, Turin, Italy

[73] Assignee: Alisyncro S.p.A., Turin, Italy

[21] Appl. No.: 455,713

[22] Filed: Jan. 5, 1983

[30] Foreign Application Priority Data

Jan. 5, 1982 [IT] Italy .............................. 67005 A/82

[51] Int. Cl.³ .......................... B65B 1/30; B65B 3/26; B65B 57/00; B65G 43/00
[52] U.S. Cl. ..................................... 53/493; 198/460; 198/572
[58] Field of Search .................... 53/493, 504, 51, 498, 53/499, 500; 198/460, 572, 575, 577, 579

[56] References Cited

U.S. PATENT DOCUMENTS

| 3,212,622 | 10/1965 | Metz | 198/460 |
| 3,248,844 | 5/1966 | Cross et al. | 53/493 |
| 3,614,853 | 10/1971 | Seragnoli | 53/493 |
| 4,360,098 | 11/1982 | Nordstrom | 198/460 |

FOREIGN PATENT DOCUMENTS

| 2346407 | 3/1974 | Fed. Rep. of Germany . | |
| 2330925 | 1/1975 | Fed. Rep. of Germany | 53/493 |
| 2521 | 1/1980 | Japan | 198/460 |
| 118801 | 3/1980 | Japan | 198/460 |
| 2045712 | 3/1980 | United Kingdom . | |
| 302885 | 10/1971 | U.S.S.R. | 53/493 |

Primary Examiner—E. Michael Combs
Attorney, Agent, or Firm—Sughrue, Mion, Zinn, Macpeak, and Seas

[57] ABSTRACT

The system for regulating the feed of articles to a wrapping machine, includes a conveyor for feeding a series of longitudinally-spaced articles to the wrapping machine sensors for detecting the position of each article on the conveyor at predetermined instants, and a control circuit for varying the speed of the conveyor in dependence on the output signals from the sensors, so that the articles are fed to the wrapping machine in a predetermined phase relation relative to it. The sensors are arranged to provide signals indicative of the degree of any deviation of each article from the correct position in phase with the wrapping machine and the control circuit is arranged to correct the speed of the conveyor in proportion to the degree of deviation detected.

4 Claims, 4 Drawing Figures

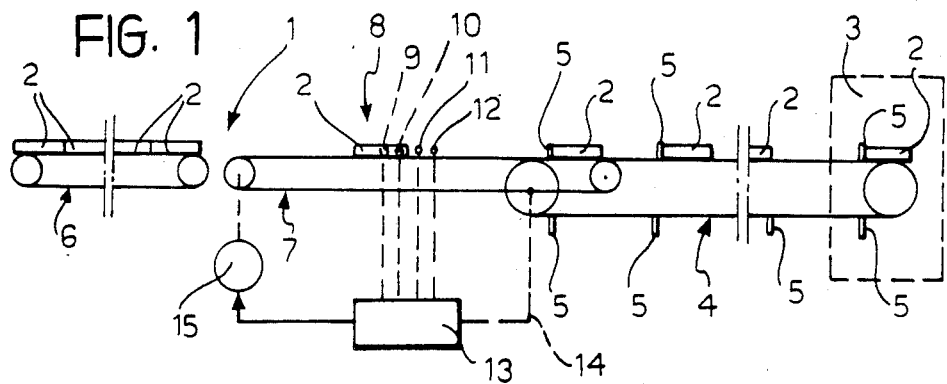
FIG. 1
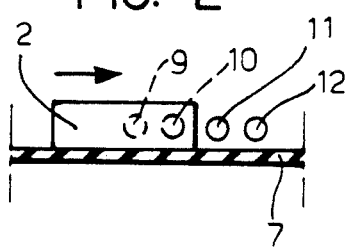
FIG. 2
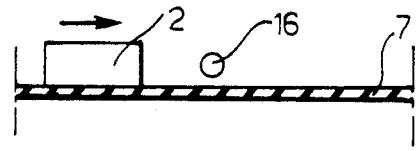
FIG. 5A
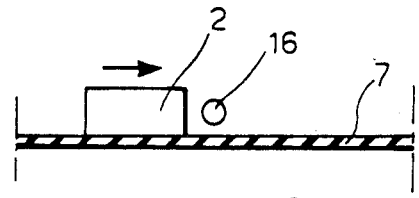
FIG. 5B
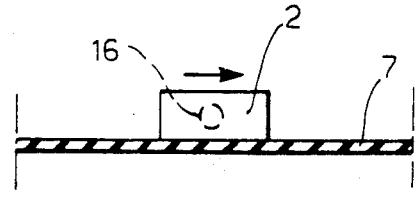
FIG. 5C
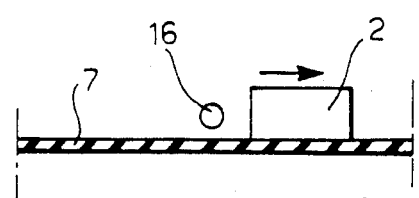
FIG. 5D
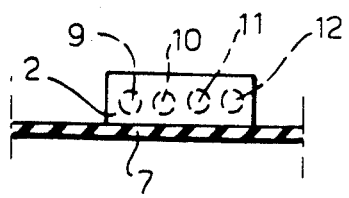
FIG. 3
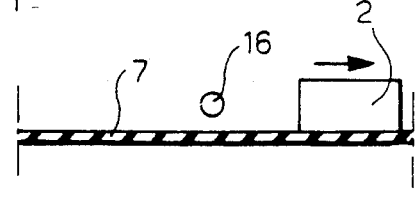
FIG. 5E
FIG. 4

SYSTEM FOR REGULATING THE FEED OF ARTICLES TO A WRAPPING MACHINE

The present invention relates to a system for regulating the feed of articles to a wrapping machine, of the type including:

conveyor means for feeding a series of longitudinally-spaced articles to the wrapping machine;

sensor means for detecting the position of each article on the conveyor means at a predetermined instant, and a control means for varying the speed of the conveyor means in dependence on the output signals from the sensor means so that the articles are fed to the wrapping machine in a predetermined phase relationship therewith.

A regulating system of the type specified above has been proposed in published U.K. Patent Application No. 2045712. In this known system, the sensor means are arranged to detect whether, at the instant at which they are actuated, a given article is ahead or behind its correct position in phase with the wrapping machine. The conveyor means are driven by the control means with two different speeds which are selected in dependence on the output signals from the sensor means. Thus, any advance or delay deviation of a given article may be corrected so as to feed this article substantially in phase with the wrapping machine.

The object of the present invention is to improve this known system by increasing the precision with which the articles are maintained in their correct positions, that is, in phase with the wrapping machine.

In order to achieve this object, the invention provides a system for regulating the feed of articles to a wrapping machine, the main characteristic of which lies in the fact that the said sensor means are arranged to provide signals indicative of the degree of any deviation of each article from the correct position in phase with the wrapping machine, and in that the control means are arranged to correct the speed of the said conveyor means in proportion to the degree of deviation detected.

In a first embodiment, the sensor means are constituted by a single sensor device which is actuated several times in correspondence with the passage of each article, whereby the series of output signals from this sensor device contains the information on the degree of any deviation of the article from its correct position phased with the wrapping machine.

In a second embodiment, the sensor means are constituted by a series of sensor devices which are longitudinally aligned and are actuated simultaneously in correspondence with the passage of each article, so as to obtain at the outputs of these sensor devices a plurality of signals which contain the information on the degree of any deviation of the article from the correct position.

In a third embodiment, the sensor means are constituted by a series of longitudinally aligned sensor devices which are actuated several times, each time simultaneously, in correspondence with the passage of each article.

According to a further preferred characteristic, different longitudinally spaced sensor means are provided so as to allow the detection of the deviation to be repeated one or more times on a single article in the course of its movement. By virtue of this characteristic, it is possible to check the result of a previously performed correction and possibly improve its precision.

Further characteristics and advantages of the present invention will emerge from the description which follows with reference to the appended drawings, provided purely by way of non-limiting example, in which:

FIG. 1 is a schematic side elevational view of a system according to the present invention, and FIGS. 2 to 5 illustrate the principle of operation of the system of FIG. 1.

In the drawings, reference numeral 1 generally indicates conveyor means arranged to feed a series of longitudinally spaced articles 2 to a wrapping machine 3 (indicated schematically in FIG. 1) provided at its input end with a conveyor device 4. This device comprises a series of blades 5 each of which thrusts a respective article 2 towards the wrapping machine.

The system according to the present invention is able to feed the articles 2 successively in a predetermined phase relationship with respect to the conveyor device 4 so as to make each article come into precise engagement with the respective blade.

It should be observed, however, that the system according to the present invention is usable in general for "phasing" articles relative to a wrapping machine irrespective of whether the member of the wrapping machine with respect to which the articles are "phased" is a bladed conveyor of the type illustrated in FIG. 1 or any other type of element.

The conveyor means 1 include a conveyor belt 6 on which accumulate the articles arriving from a conveyor line disposed upstream (not illustrated), and a conveyor belt 7 which moves at a velocity greater than that of the belt 6, so as to achieve longitudinal spacing of the articles from each other, and has a length such that there is nevermore than one article present thereon.

Sensor means 8 are associated with the conveyor belt 7 and, in the example illustrated, are constituted by four photoelectric cells 9 to 12 the actuation of which is effected through control means 13 by the said conveyor device 4, as indicated schematically by line 14. This may be achieved in any known manner (see, for example, German Offenlegungeschrift No. 2346407). The expression "actuation of the sensor means" refers both to the case of true actuation and to the case in which the cells 9 to 12 are in fact always active, thus "actuation" consisting of making a comparison between the output signal from the cells and a predetermined threshold signal.

Since the actuation of the sensor means 8 is effected by the conveyor device 4, the instants at which these sensor means are actuated correspond to predetermined positions of the conveyor device 4. It follows that the sensor means 8 are arranged to detect whether at a predetermined instant a given article is in the correct position, that is, in phase with the conveyor device 4.

Assuming, for example, that the position in which a given article 10 should be at the instant of actuation of the sensor means 8, to be correctly in phase with the conveyor device 4, is that illustrated in FIG. 2 then, under these conditions, the photoelectric cells 9, 10 would be obscured, while the photoelectric cells 11, 12 would be clear. Whenever the article 2, at the instant of actuation of the photocells, is in the position illustrated in FIG. 3, the photocells 9, 10, 11 are obscured and only the photocell 12 is clear. This indicates that the article is slightly ahead. If then, at the instant of actuation, all the photocells 9 to 12 are obscured (FIG. 4), this indicates that the article 2 is even more in advance. Similarly, the fact that the cell 10, and possibly the cell 9, are clear at the instant of actuation, indicates that the article 2 is behind, the degree of delay being greater when both the cells 9, 10 are clear.

From what is stated above, it is clear that the output signals from the sensor means 8 are indicative not only of the direction of any deviation of a given article from the correct position but also of the degree of this deviation.

The control means 13 receive the output signals from the sensor means 8 and actuate a motor 15 which drives the conveyor belt 7, varying the speed so as to correct the said deviation.

According to the invention, the control means 13 are arranged to correct the speed in proportion to the degree of deviation detected by the sensor means 8.

By virtue of this characteristic, the system according to the invention guarantees precise "phasing" of the articles.

Naturally, the degree of precision may be increased by increasing the number of sensors, so as to enable a higher number of differentiated levels of advance or delay of the article relative to its correct position to be detected.

In a variant, the sensor means 8 are constituted by a single photoelectric cell 16 which is actuated several times in correspondence with the passage of a single article.

With reference to FIG. 5, assuming, for example, that the photoelectric cell 16 is actuated five times in succession in correspondence with the passage of each article, then FIG. 5 illustrates the positions in which the article 2 must be at each instant of actuation to be correctly in phase with the conveyor device 4. As is seen, in the case of this example, if the article 2 is in its correct position, the photoelectric cell 16 must be clear at the instants of the first two actuations A and B, must be obscured at the instant of the third C and must be clear again at the instants of the final two actuations D and E. If the article 2 is ahead of the correct position, the photoelectric cell 16 is already obscured at the instant of the second actuation B, and if the degree of advance is considerable the cell 16 is already obscured at the instant of the first actuation A. Similarly, if the article is delayed, the photoelectric cell 16 may again be obscured at the instant of the fourth actuation D and possibly (a greater delay) at the instant of the final actuation E. Hence, the series of output signals emitted by the photoelectric cell 16 in correspondence with the passage of each article 2 is indicative not only of the direction of any deviation of the article with respect to its correct position, but also the degree of this deviation. Again in this case, the control means 13 are arranged to effect a correction of the speed, which is proportional to the degree of deviation detected. The precision of the correction may be increased by increasing the number of actuations of the photocell 16 in correspondence with the passage of each article so as to enable the detection of a higher number of differentiated levels of advance or delay of the article with respect to its correct position.

Naturally, it is possible to provide a system constituted by a combination of the two variants described above. Thus, it is possible to provide a series of longitudinally aligned sensors of the photoelectric cell type 9 to 12 illustrated in FIG. 1, and to actuate the sensors several times, each time simultaneously, in correspondence with the passage of each article, in accordance with the example illustrated with reference to FIG. 5. This allows the number of differentiated levels of advance or delay detectable by the sensor means to be increased further.

In a further variant (not illustrated), several conveyors of the conveyor type 7 are provided which are located downstream of one another and are each provided with sensor means of the same type as the sensor means 8 to allow the detection of any deviation from the correct position to be repeated several times on a single article in the course of its movement, so as to check the result of previously effected corrections and possibly to improve its precision.

I claim:

1. A system for regulating the feed of articles to a wrapping machine, comprising:

conveyor means for feeding a series of longitudinally spaced articles to the wrapping machine; said conveyor means including a first accumulation belt conveyor on which the articles are accumulated in an aligned condition and a second spacing belt conveyor having a length for supporting only a single article at a time thereon at the desired spacing, said second belt conveyor receiving the articles from the first accumulation belt conveyor and feeds said articles to the wrapping machine, said second belt conveyor having a speed greater than that of said first belt conveyor so as to cause the spacing of the articles from each other, sensor means operable at predetermined time intervals for detecting the position of each article on said second spacing belt conveyor relative to said sensor means, control means for varying the speed of said second spacing belt conveyor in dependence on output signals from the sensor means so that the articles are fed to the wrapping machine in a predetermined phase relationship therewith, said sensor means being arranged to provide a combination of on/off signals which contains the information on the degree of any deviation of each article from the correct position in phase with the wrapping machine and said control means being arranged to correct the speed of the second spacing belt conveyor in proportion to the degree of deviation detected.

2. A system according to claim 1 wherein said sensor means are constituted by a single sensor device which is actuated several times in correspondence with the passage of each article.

3. A system according to claim 1 wherein said sensor means are constituted by a series of sensor devices which are longitudinally aligned and are actuated simultaneously in correspondence with the passage of each article.

4. A system according to claim 1 wherein said sensor means are constituted by a longitudinally aligned series of sensor devices which are simultaneously actuated several times in correspondence with the passage of each article.

* * * * *